United States Patent
Morgan, Jr.

[15] 3,635,198
[45] Jan. 18, 1972

| [54] | SHIPPING CONTAINER FOR POULTRY |
|---|---|
| [72] | Inventor: William R. Morgan, Jr., R.F.D. #2, Box 70, Hurlock, Md. 21643 |
| [22] | Filed: Dec. 10, 1969 |
| [21] | Appl. No.: 883,689 |

| [52] | U.S. Cl. ............................................119/19, 119/97 R |
| [51] | Int. Cl. ..........................................................A01k 37/00 |
| [58] | Field of Search............................119/97, 45, 19, 17, 15; 220/23.6, 97 R; 214/10.5 |

[56] References Cited

UNITED STATES PATENTS

| 1,257,796 | 2/1918 | Brooks..................................119/45 R |
| 1,942,056 | 1/1934 | Gottsch..................................119/45 R |
| 2,122,731 | 7/1938 | Summers................................119/97 R |
| 2,781,023 | 2/1957 | Brembeck..............................119/45 R |
| 3,044,444 | 7/1962 | Rosenthal ..............................119/45 R |
| 3,260,239 | 7/1966 | Sanders..................................119/97 R |

*Primary Examiner*—Hugh R. Chamblee
*Attorney*—Scrivener, Parker, Scrivener and Clarke

[57] ABSTRACT

The nestable shipping container for poultry includes a plurality of open ended, elongated compartments formed to completely enclose and support the body of a bird during shipment. The compartments are secured together to form a unitary assembly, and adjacent compartments are shaped to define upper and lower receiving spaces therebetween to receive a portion of an overlying or underlying compartment.

13 Claims, 5 Drawing Figures

PATENTED JAN 18 1972

3,635,198

INVENTOR
WILLIAM R. MORGAN, JR.

BY *Scrivener Parker Scrivener & Clarke*
ATTORNEYS

SHIPPING CONTAINER FOR POULTRY

Poultry has conventionally been transported from the farm to the processing plant in large coops containing a number of live birds. The mortality rate among birds shipped in this manner is often quite high as a result of suffocation or injuries suffered in transit. Many of the surviving birds suffer bruises, broken bones, or other injuries caused by the motion of a transporting vehicle or bodily contact with other birds in the coop.

In an attempt to minimize the physical damage suffered by live birds in shipment and simplify the process of handling the birds both at the farm and the processing plant, improved shipping coops have been designed to maintain birds in spaced relationship during shipment. The U.S. Pat. Nos. 3,234,915 and 3,260,239 to Dickenson H. Sanders illustrate stackable, lightweight shipping containers for transporting a number of live birds in spaced relationship. These containers include a plurality of molded supports contoured to fit the underside of a live bird and to support a substantial area of the underside of the bird. The supports are normally positioned to slope downwardly from the back to the front of the container to hold a bird in a downwardly sloping position, and retaining means are secured to the container adjacent each support to engage and hold the legs of a bird resting on the support.

Containers including spaced supports for the underside of individual birds have decreased the incidence of injury during shipment, but the birds are not completely restrained. Instead, such containers are designed in reliance on the theory that a bird, if held in a position such that it is sloping downwardly with head below the horizontal and with its clavicle supported, will remain motionless as long as there is movement of the container within which the bird is positioned. Thus, in such containers, the wings of the bird are not restrained and only the legs are tethered.

It cannot be assumed that, during shipment, the vehicle transporting poultry to a processing plant will always be in motion and that there will be constant movement of the poultry containers. Should the containers remain motionless for a period of time, the birds tend to become restless and attempt to twist or move about on the supports. With no restraint applied to hold the birds against the supports, the birds may bruise themselves against the supports or the container. Additionally, with the birds suspended by the feet on the inclined supports, bouncing motions of the transporting vehicle bounce the birds against the supports causing bruising and injury. Also, the necessity to individually lock the feet of each bird within the container requires the expenditure of extra time in loading and unloading the birds from the container.

Accordingly, the primary object of the present invention is to provide a shipping coop for poultry which includes a support unit for each individual bird which completely surrounds and retains the body of the bird and eliminates the necessity for providing additional locking units for engaging and tethering a portion of the bird. These support units engage the sides, back, and underside of the bird and thereby prevent bouncing of the bird or violent movement of the wings.

Another object of the present invention is to facilitate loading and unloading of poultry from a shipping coop by providing open ended retaining support units which permit insertion of a bird at the rear end thereof and withdrawal of the bird at the front end thereof. The front open ends of the retaining support units may be provided with spring-biased closure means extending across the lower portion of the open end to permit insertion of the birds while the coop is inclined with the rear portion thereof above the front portion.

A still further object of the present invention is to provide a shipping coop which is of lightweight construction and which may be nested with coops of similar construction while permitting air circulation in the stack of coops. Also the coop is designed to facilitate mechanical loading and unloading and transportation by overhead conveyor devices.

Other objects and advantages of the invention will become apparent from a study of the following specification when viewed in light of the accompanying drawing in which.

Figure 1:
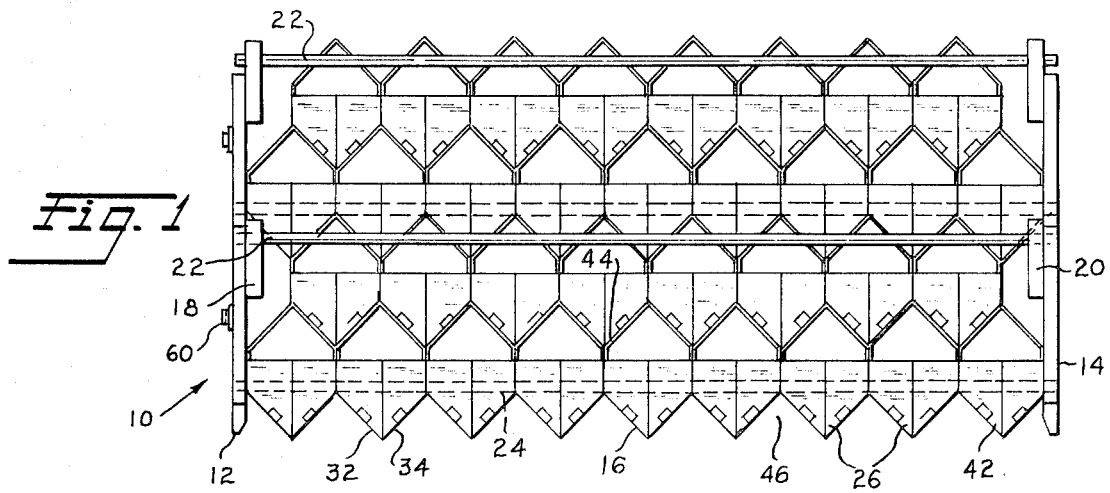
FIG. 1 is a view in side elevation illustrating two poultry shipping coops of the present invention in nested relation.
Figure 2:
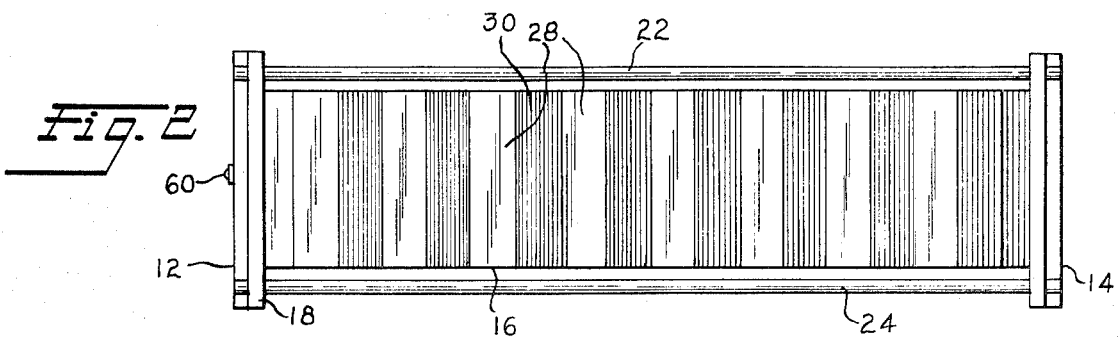
FIG. 2 is a plan view of the poultry shipping coop.
Figure 3:
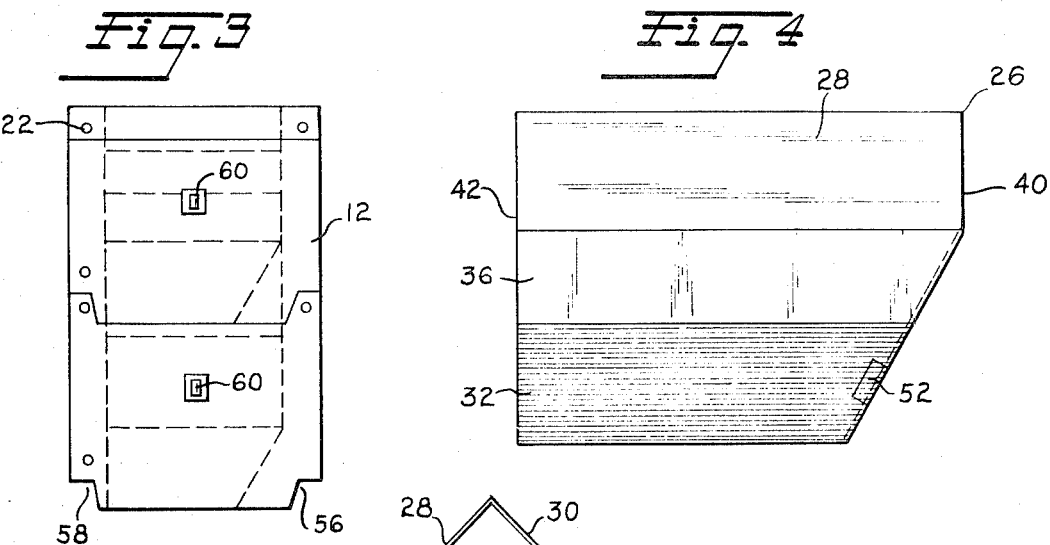
FIG. 3 is an end view of the nested poultry shipping coops of FIG. 1.

Referring to the drawing, the shipping coop 10 of the present invention includes spaced, parallel end walls 12 and 14 positioned at opposite ends of a honeycomb container assembly 16. Elongated guide members 18 and 20 are secured to the inner face of the end walls 12 and 14 respectively and extend upwardly beyond the upper edges of the ends walls. An upper crossbar 22 is secured between the guide members 18 and 20 at the rear portion of the shipping coop while a lower crossbar 24 is secured between the end walls of the coop at the front portion thereof adjacent the lower edges of the end walls. The end walls and crossbars form a lightweight support frame for the container assembly 16.

The honeycomb container assembly 16 is secured to the endwalls 12 and 14 and is spaced inwardly of the crossbars 22 and 24. This assembly includes a plurality of individual, open ended compartments 26 secured together in rows to form a unitary assembly. These compartments are of equal size and preferably substantially polygonal in cross section, although it will be apparent that compartments of other shapes arranged in honeycomb fashion could be employed.

Each compartment 26 is formed with inclined top walls 28 and 30 angling downwardly from an upper central juncture point and inclined bottom walls 32 and 34 angling upwardly from a lower central juncture point; said upper and lower central juncture points being substantially aligned. Spaced vertical sidewalls 36 and 38 extend between the top and bottom walls to form an open ended enclosed chamber having a forward end 40 and a rear end 42. The sidewalls of adjacent compartments in each row are secured together, and it will be noted that spaces 44 are formed above the juncture between adjacent compartment sidewalls while spaces 46 are formed below said juncture. The spaces 44 are adapted to receive the bottom walls 32 and 34 of overlying compartments of similar construction while the spaces 46 receive the top walls 28 and 30 of underlying compartments. The respective top and bottom walls of compartments in adjacent rows within a container assembly 16 are secured together as are the sidewalls of compartments within each row.

The top walls of the compartments 26 in the uppermost row of each container assembly 16 and the bottom walls of the compartments in the lowermost row extend above and below the crossbars 22 and 24 and mate with the spaces 44 and 46 in the uppermost and lowermost compartment rows of a similar coop 10 when the coops are stacked. The guide members 18 and 20 engage the end walls 12 and 14 of an overlying coop to position the bottom walls of the compartments in the lowermost row thereof over the spaces 44 for ease of stacking.

Both the forward and rear ends 40 and 42 of the compartments 26 may be left open, but preferably, the lower portion of the open forward end is closed by an outwardly pivotal closure. This closure includes doors 48 and 50 which mate in the center of the opening in forward end 40 and which are secured to the compartment 26 by hinges 52 and 54 attached to either side thereof. These hinges are spring hinges which bias the doors in the closed position illustrated by FIG. 5.

Figure 4:
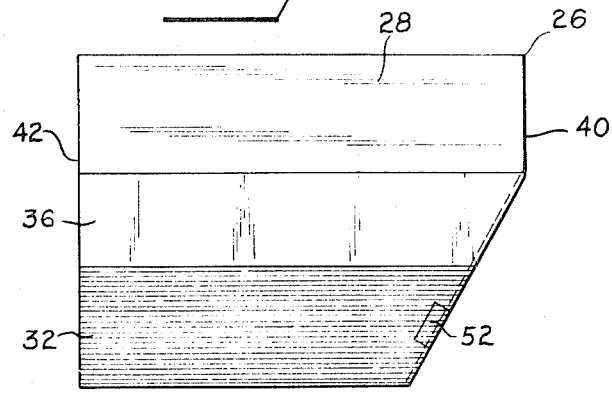
FIG. 4 is a view in side elevation of a compartment for the poultry shipping coop.
Figure 5:
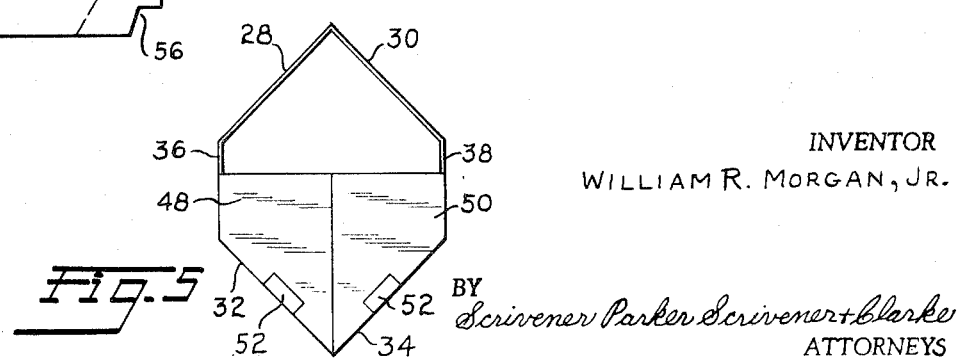
FIG. 5 is a front end view of the compartment of FIG. 4.

The forward edges of the sidewalls 36 and 38 and the bottom walls 32 and 34 may be inclined from the juncture with the top walls 28 and 30 toward the rear of the compartment 26 as illustrated in FIG. 4. With this construction, the doors 48 and 50 will be similarly inclined to close the lower portion of the open end 40, and these doors will pivot outwardly and downwardly when the hinges 52 and 54 are secured to the bottom walls as shown in FIG. 5.

To facilitate stacking of the shipping coops 10, the forward and rear edges of each end walls, 12 and 14 are cut away adjacent the bottom edge thereof at 56 and 58 to permit the end walls of a superimposed coop to fit over the upper crossbar 22 of an underlying coop. Also, a roller bearing 60 is mounted upon the outer surface of one end wall of each coop to permit adjacent coops to slide easily relative to one another in a confined space.

To fill the shipping coop 10, the coop is preferably supported in an inclined position with the forward ends of the compartments 26 below the rear ends thereof. Birds are then passed from the poultry house to graders who have the responsibility of removing birds unsuitable for shipment. The remaining birds are inserted head first through the rear end 42 of a compartment 26, and the bird moves into the compartment until the breast of the bird contacts the inner surface of the doors 48 and 50 and the head projects through the opening above the doors. A gate attachment including closure bars which extend between the end walls 12 and 14 across the rear open ends 42 of each compartment in a coop may be secured to the end walls of the coop to retain the birds within the compartments. As a practical matter, however, such gate attachments are seldom necessary, as the birds never try to back from the coop but instead attempt to push through the forward end of each compartment. The spring hinges on the doors 48 and 50 provide sufficient bias to prevent a bird from forcing the doors open.

When each individual compartment of a coop contains a bird, the coop may be suspended from a coop loader by the upper crossbar 22 and conveyed to a truck where the individual coops are stacked in the manner shown by FIG. 1. At the processing plant, the coops may be again suspended from an overhead conveyor by the crossbar 22 and moved through a slaughtering station wherein the birds are killed in the coop. The slaughtered birds are allowed to bleed in the coop where they cannot bruise themselves, and are then pulled from the coop by the neck which causes the doors 48 and 50 to spring open and release the body of each bird. The coops, still on the conveyor, are then transported through washing and sanitizing stations in preparation for reuse.

The procedure of killing the birds while in the nestable shipping container affords an economic benefit to poultry farmers at the processing plant where a savings in handling can mean the difference between profit or loss. With the rising cost of labor, any reduction in handling time would profit the farmer. However, the present procedure is both costly in time and money. The birds are taken from a conventional coop and hung on movable shackles where they are killed, and afterwards, while still hanging on the shackles, are passed through scalders and automatic picking machines. The job of removing the live birds from their coops is time consuming and costly since the birds thresh about resisting removal from the coops. If the time spent in removing one bird is multiplied by the many birds handled at a processing plant, the time would seriously subtract from the total profits.

Because the birds thrash about in the coop while they are being removed, they are often bruised, but in the improved coop of the present invention, bruises are reduced since the bird is killed before removal, whereby the amount of thrashing is greatly reduced.

In many jurisdictions there has been increasing alarm about poultry trucks dropping manure from the empty coops. This problem can be solved by conveying the coops of the instant invention, when suspended from an overhead conveyor, through a tunnel equipped with high-pressure water sprayers. In this manner the coops which lend themselves to easy washing and sanitizing will not present any health problems from diseases common to poultry.

I claim:

1. A nestable shipping coop for poultry comprising a container assembly including a plurality of open ended, elongated compartment means, each formed to completely enclose and support the body of a single bird in a substantially horizontal position when the coop is in normal shipping position, said compartment means being secured together to form a unitary assembly having at least one row of said compartment means, adjacent compartment means in said row being shaped to define upper and lower receiving spaces therebetween adapted to receive a portion of overlying and underlying compartment means of similar construction, and a pair of spaced end walls joined together by crossmembers to form a support frame, said container assembly being secured to said end walls and spaced inwardly of said crossmembers.

2. The nestable shipping coop of claim 1 wherein said end walls include guide means for engaging and positioning a second adjacent coop of similar construction when said coops are stacked to permit the mating of compartment means of each coop with aligned receiving spaces of the adjacent coop.

3. The nestable shipping coop of claim 2 wherein said guide means are secured to the inner faces of each end wall and extend upwardly beyond the upper edge thereof.

4. The nestable shipping coop of claim 3 wherein said crossmembers include an upper crossbar secured between said guide means adjacent the upper edge thereof at the forward end of said coop and a lower crossbar secured between said end walls adjacent the lower edges thereof at the rear end of said coop.

5. The nestable shipping coop of claim 4 wherein the compartment means of said container assembly extend above and below said support frame beyond said upper and lower crossbars.

6. The nestable shipping coop of claim 1 which includes roller bearing means secured to the outer surfaces of one of said end walls.

7. The nestable shipping coop of claim 1 wherein each said compartment means is substantially polygonal in cross section.

8. The nestable shipping coop of claim 1 wherein said container assembly is a honeycomb construction including at least an upper row of compartment means and a lower row of compartment means underlying said upper row, the compartment means of said upper row being received in the upper receiving spaces between the compartment means in said lower row.

9. A nestable shipping coop for poultry comprising a container assembly including a plurality of open ended, elongated compartment means, each formed to completely enclose and support the body of a single bird in a substantially horizontal position when the coop is in normal shipping position, said compartment means being secured together to form a unitary assembly having at least one row of said compartment means, adjacent compartment means in said row being shaped to define upper and lower receiving spaces therebetween adapted to receive a portion of overlying and underlying compartment means of similar construction, each said compartment means includes a unitary outer wall enclosing an internal chamber having forward and rearward open ends, and closure means attached to each said compartment means adjacent the forward open end thereof to close the lower portion of said forward open end, said closure means being adapted to pivot outwardly from said forward open end.

10. The nestable shipping coop of claim 9 wherein said closure means is spring biased against the forward open end of said container means.

11. A nestable shipping coop for poultry comprising a container assembly including a plurality of open ended, elongated compartment means, each formed to completely enclose and support the body of a single bird in a substantially horizontal position when the coop is in normal shipping position, said compartment means being secured together to form a unitary assembly having at least one row of said compartment means, adjacent compartment means in said row being shaped to define upper and lower receiving spaces therebetween adapted to receive a portion of overlying and underlying compartment means of similar construction and a pair of spaced end walls joined together by crossmembers to form a support frame, said container assembly being secured to said end walls and spaced inwardly of said crossmembers, and guide means secured to the inner face of each end wall, said guide means extending upwardly beyond the upper edge of said end walls to engage and position a second adjacent coop of similar construction when said coops are stacked to permit the mating of compartment means of each coop with aligned receiving spaced of the adjacent coop.

12. The nestable shipping coop of claim 11 wherein said crossmembers include an upper crossbar secured between said guide means adjacent the upper edge thereof at the forward end of said coop and a lower crossbar secured between said end walls adjacent the lower edges thereof at the rear end of said coop, the compartment means of said container assembly extending above and below said support frame beyond said upper and lower crossbars.

13. The nestable shipping coop of claim 12 wherein each said compartment means is substantially polygonal in cross section and includes a unitary outer wall enclosing an internal chamber having forward and rearward open ends, and closure means attached to each said compartment means adjacent the forward open end thereof to close the lower portion of said forward open end, said closure means including a pair of outwardly pivotal doors which mate at substantially the center of said forward open end and which are pivotally secured to said container means on opposite sides of said forward open end, said doors being spring biased to a closed position over the forward open end of said container means.

* * * * *